(12) United States Patent
Cabaj

(10) Patent No.: US 11,873,889 B2
(45) Date of Patent: Jan. 16, 2024

(54) STAINLESS STEEL RUNNING SURFACE ON A PLASTIC DEFLECTOR

(71) Applicants: Linamar Corporation, Guelph (CA); Michael Cabaj, Canton, MI (US)

(72) Inventor: Michael Cabaj, Canton, MI (US)

(73) Assignee: Linamar Corporation, Guelph (CA)

( * ) Notice: Subject to any disclaimer, the term of this patent is extended or adjusted under 35 U.S.C. 154(b) by 95 days.

(21) Appl. No.: 17/626,594

(22) PCT Filed: Jul. 13, 2020

(86) PCT No.: PCT/US2020/070260
§ 371 (c)(1),
(2) Date: Jan. 12, 2022

(87) PCT Pub. No.: WO2021/011953
PCT Pub. Date: Jan. 21, 2021

(65) Prior Publication Data
US 2022/0243800 A1 Aug. 4, 2022

Related U.S. Application Data

(60) Provisional application No. 62/873,248, filed on Jul. 12, 2019.

(51) Int. Cl.
*F16H 57/029* (2012.01)
*F16H 48/40* (2012.01)
(Continued)

(52) U.S. Cl.
CPC ........... *F16H 57/029* (2013.01); *F16H 48/40* (2013.01); *F16J 15/3204* (2013.01); *F16H 2048/387* (2013.01)

(58) Field of Classification Search
CPC ................ F16C 33/723; F16C 33/7813; F16C 33/7876; F16C 33/7826; F16C 33/7886;
(Continued)

(56) References Cited

U.S. PATENT DOCUMENTS 3,612,551 A * 10/1971 Grabill, Jr. ........... F16J 15/3236
277/566
9,677,656 B2 6/2017 Downs et al.
(Continued)

FOREIGN PATENT DOCUMENTS

JP 2005163928 6/2005
JP 2015064054 4/2015

*Primary Examiner* — Lori Wu
(74) *Attorney, Agent, or Firm* — Miller Canfield

(57) ABSTRACT

A differential for a rear wheel drive vehicle is previewed comprising a differential case for rotationally supporting and housing a pinion shaft with the pinion shaft extending axially through an opening in the differential case. A pinion seal extends around the pinion shaft and has an outer edge abutting a cavity wall defining the opening in the differential case. The pinion seal has an axial lip projecting in an axial direction. A plastic deflector has a discshaped main body formed of a plastic material, a passageway extending through the plastic deflector, and a stainless steel ring fixedly coupled to the disc-shaped main body providing a stainless steel running surface. The plastic deflector is assembled on the pinion shaft such that the pinion shaft extends through the deflector passageway and the stainless steel running surface abuts the axial lip of the pinion seal.

9 Claims, 9 Drawing Sheets

(51) Int. Cl.
*F16J 15/3204* (2016.01)
*F16H 48/38* (2012.01)

(58) Field of Classification Search
CPC .. F16C 2361/61; F16H 57/031; F16H 57/029; F16H 57/037; F16H 48/40; F16H 2048/387; F16H 2048/423; F16J 15/3204; F16J 15/3252; F16J 15/3456
See application file for complete search history.

(56) References Cited

U.S. PATENT DOCUMENTS

| | | | |
|---|---|---|---|
| 10,309,517 B1 | 6/2019 | Nowaczyk et al. | |
| 2005/0031240 A1* | 2/2005 | Dodoro | F16C 19/163 384/494 |
| 2006/0094558 A1* | 5/2006 | Petruska | F16H 57/029 475/220 |
| 2007/0242913 A1* | 10/2007 | Kawaguchi | F16C 19/182 384/504 |
| 2016/0010692 A1* | 1/2016 | Yonekura | F16C 33/723 277/351 |

* cited by examiner

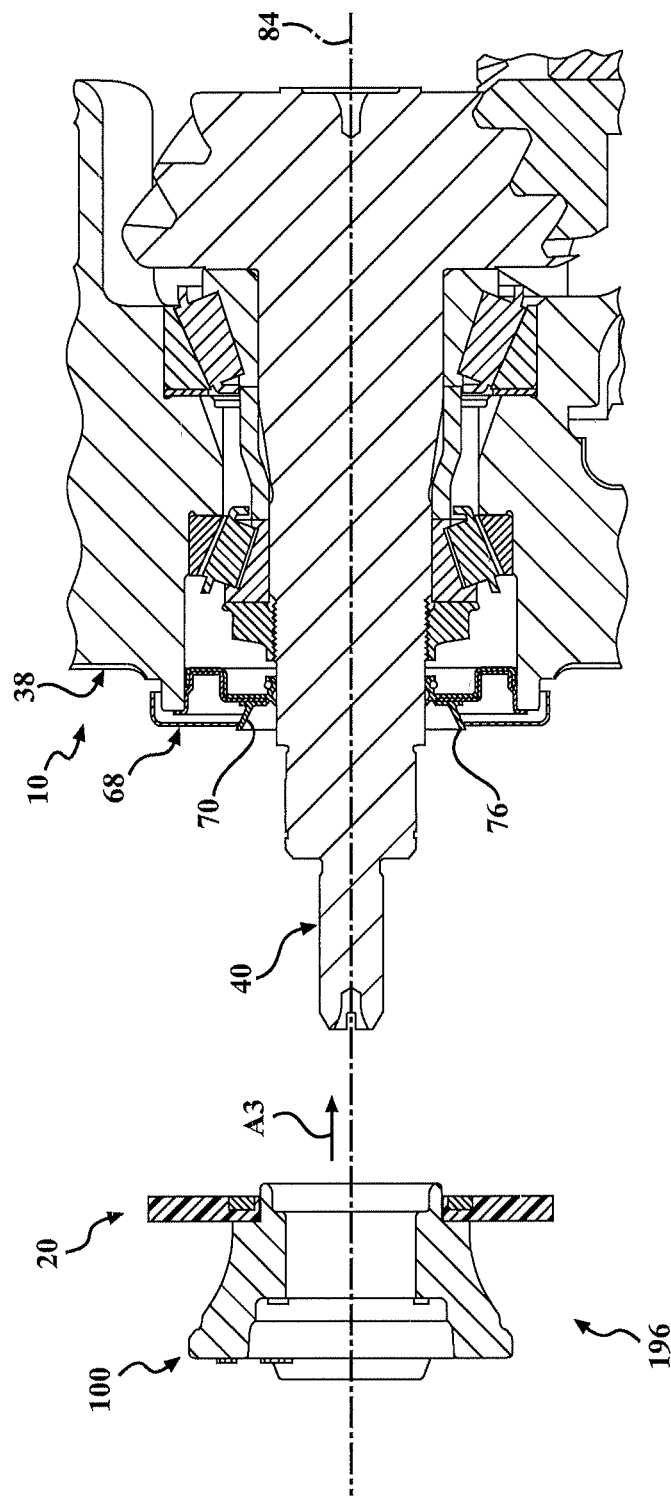

STAINLESS STEEL RUNNING SURFACE ON A PLASTIC DEFLECTOR

CROSS-REFERENCE TO RELATED APPLICATIONS

This application claims priority to U.S. Provisional Application No. 62/873,248, filed on Jul. 12, 2019.

BACKGROUND OF THE INVENTION

1. Field of the Invention

The present invention relates to a differential for a vehicle having rear drive wheels. More specifically, the present invention relates to a deflector covering a pinion seal.

2. Description of Related Art

In vehicles that have rear drive wheels, drive shafts and differentials are used to transmit power from the engine and transmission of the vehicle to the wheels. The drive shafts are used to transmit power from the transmission to the differential. The differential is housed in a differential case and each differential has a pinion shaft and pinion gear that attaches to the drive shaft inside the differential case to transfer the power from the drive shaft to the drive wheel. Each pinion shaft has a pinion seal extending around the pinion shaft that is used to seal differential fluid (oil) from leaking out of the differential case. The pinion seal includes an axial lip. A stainless steel deflector ring is pressed between the differential case and the pinion shaft to abut against the axial lip of the pinion seal to seal the differential fluid within the differential case. However, the stainless steel ring is costly and causes galvanic corrosion problems in the differential.

Therefore, it is desirable to provide an improved seal between the shaft and differential case. Further, it is desirable to provide a deflector ring having a lower cost than the stainless steel deflector ring. Finally, it is desirable to reduce the galvanic corrosion problems in the differential caused by the stainless steel deflector ring.

SUMMARY OF THE INVENTION

A differential for a rear wheel drive vehicle is provided comprising a differential case for rotationally supporting and housing a pinion shaft with the pinion shaft extending axially through an opening in the differential case. A pinion seal extends around the pinion shaft and has an outer edge abutting a cavity wall defining an opening in the differential case. The pinion seal has an axial lip projecting in an axial direction. A plastic deflector has a disc-shaped main body formed of a plastic material, a passageway extending through the plastic deflector, and a stainless steel ring fixedly coupled to the disc-shaped main body providing a stainless steel running surface. The plastic deflector is assembled on the pinion shaft such that the pinion shaft extends through the deflector passageway and the stainless steel running surface abuts the axial lip of the pinion seal.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 illustrates the plastic deflector and flange of FIG. 2 being assembled with the pinion shaft and the pinion seal of FIG. 2;

DETAILED DESCRIPTION OF THE EMBODIMENTS

Figure 1:
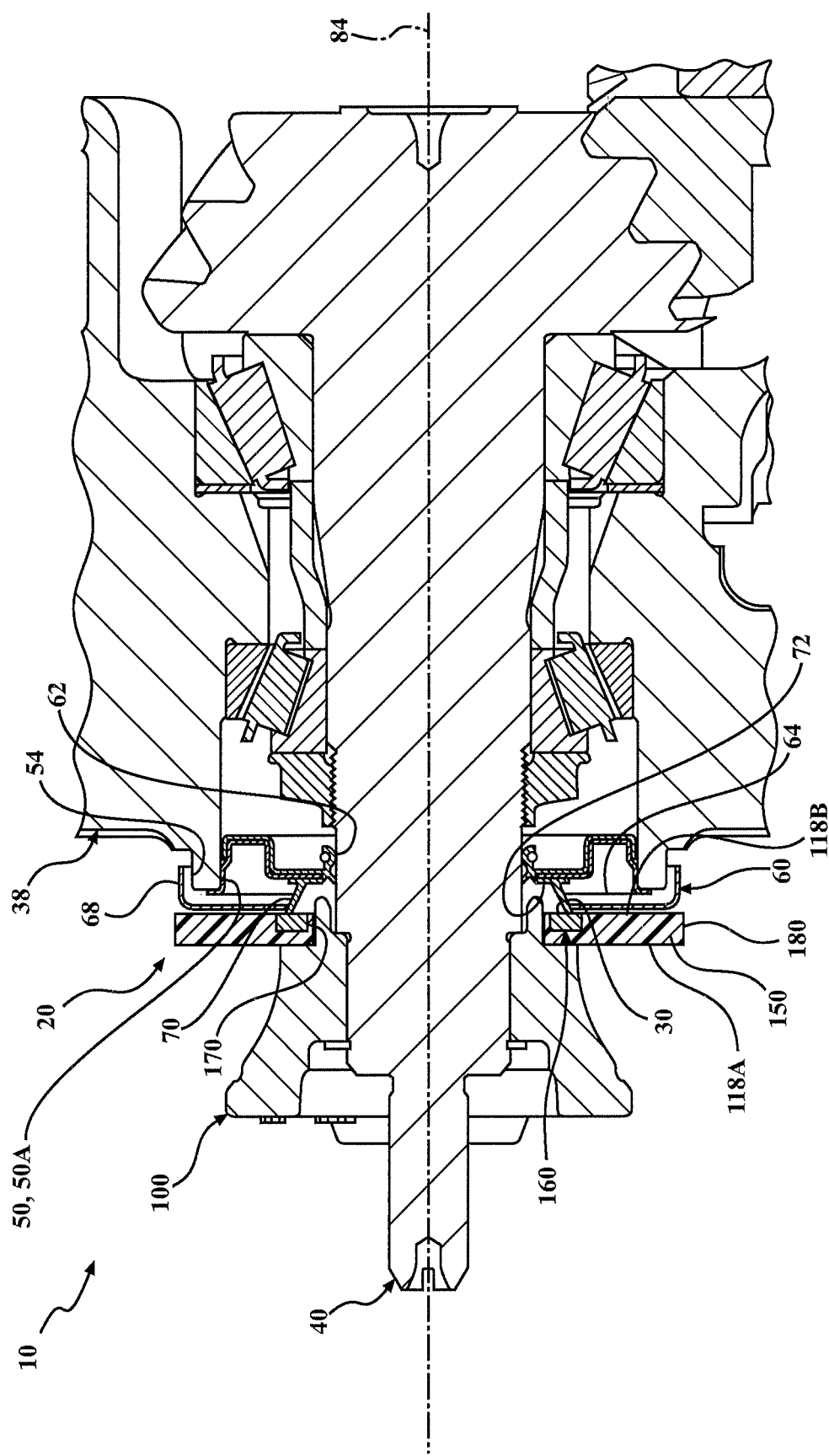
FIG. 1 is a cross-sectional view of a portion of rear wheel drive differential having a plastic deflector with a stainless steel running surface, according to one embodiment of the present invention.

Referring to the Figures, wherein like numerals indicate like or corresponding parts throughout the several views, a portion of a differential 10 for a rear wheel drive vehicle is shown in FIG. 1, illustrating one embodiment of a plastic deflector 20 with a stainless steel running surface 30. The differential 10 includes a differential case 38 for rotationally supporting and housing a pinion shaft 40. The pinion shaft 40 extends axially through an opening 50 in the differential case 38 to connect with and drive the rear wheels of the vehicle. The differential case 38 may also include a rim 54 extending circumferentially around the opening 50.

Referring to FIG. 1, a pinion seal 60 extends around the pinion shaft 40 and abuts a cavity wall 50A defining the opening 50 in the differential case 38. It is known to provide the pinion seal 60 between the pinion shaft 40 and the differential case 38 to prevent the oil from leaking out of the differential case 38. The pinion seal 60 is configured to cover the opening 50 in the differential case 38 around the pinion shaft 40.

Figure 2:
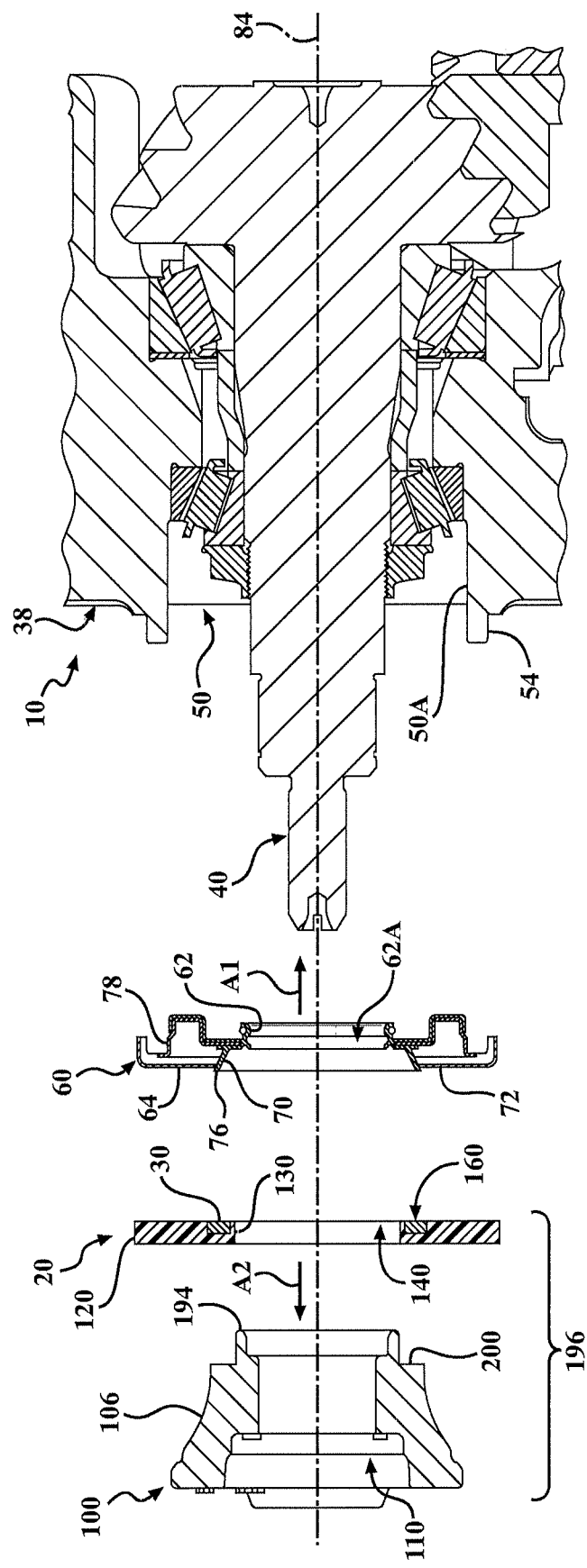
FIG. 2 is an exploded view of the portion of the differential of FIG. 1, illustrating a pinion seal being assembled with a pinion shaft within a differential case, and the plastic deflector being assembled with a flange.

An exploded view of the portion of the differential 10 of FIG. 1 is illustrated in FIG. 2. The pinion seal 60 typically has an inner edge 62 configured to abut the pinion shaft 40, a seal main body portion 64 extending radially between the inner edge 62 and an outer edge 68 of the pinion seal 60, an axial lip 70 extending from an upper surface 72 of the seal main body portion 64 towards an upper lip edge 76, and an outer cylindrical wall 78 configured to frictionally engage with the cavity wall 50A of the opening 50 in the differential case 38. Further, the inner edge 62 of the pinion seal 60 defines a passageway 62A extending through the pinion seal 60.

The pinion seal 68 can have a variety of configurations depending on the specific requirements of an end application. Typically, the pinion seal 60 extends between the outer wall 50A of the opening 50 and the pinion shaft 40. Optionally, the pinion seal 60 can extend around the outer rim 54 on the opening 50 of the differential case 38. Regardless of the geometry of the pinion seal 68, it is desirably that the stainless steel running surface 30 of the plastic deflector 20 abuts the axial lip 70 to form a seal between the plastic deflector 20 and the pinion seal 60.

As illustrated in FIG. 2, the pinion seal 68 is assembled with the pinion shaft 40 by pressing the pinion seal 68 into the opening 50 in an axial direction 84 of the pinion shaft 40 until the outer cylindrical wall 78 abuts the cavity wall 50A in the differential case 38, as indicated by arrow A1.

Returning to FIG. 1, the plastic deflector 20 is assembled on the pinion shaft 40 such that the stainless steel running surface 30 abuts the axial lip 70 of the pinion seal 68. A flange 100 is assembled with the pinion shaft 40 such that the flange 100 frictionally engages with and abuts the plastic deflector 20, as illustrated in FIG. 1. Referring to FIG. 2, the flange 100 has a generally cylindrically-shaped main body 106 with a flange passageway 110 extending axially through the flange 100. The passageway 110 is configured to matingly engage with the pinion shaft 40 via a threaded connection, a splined connection, or the like.

Figure 4:
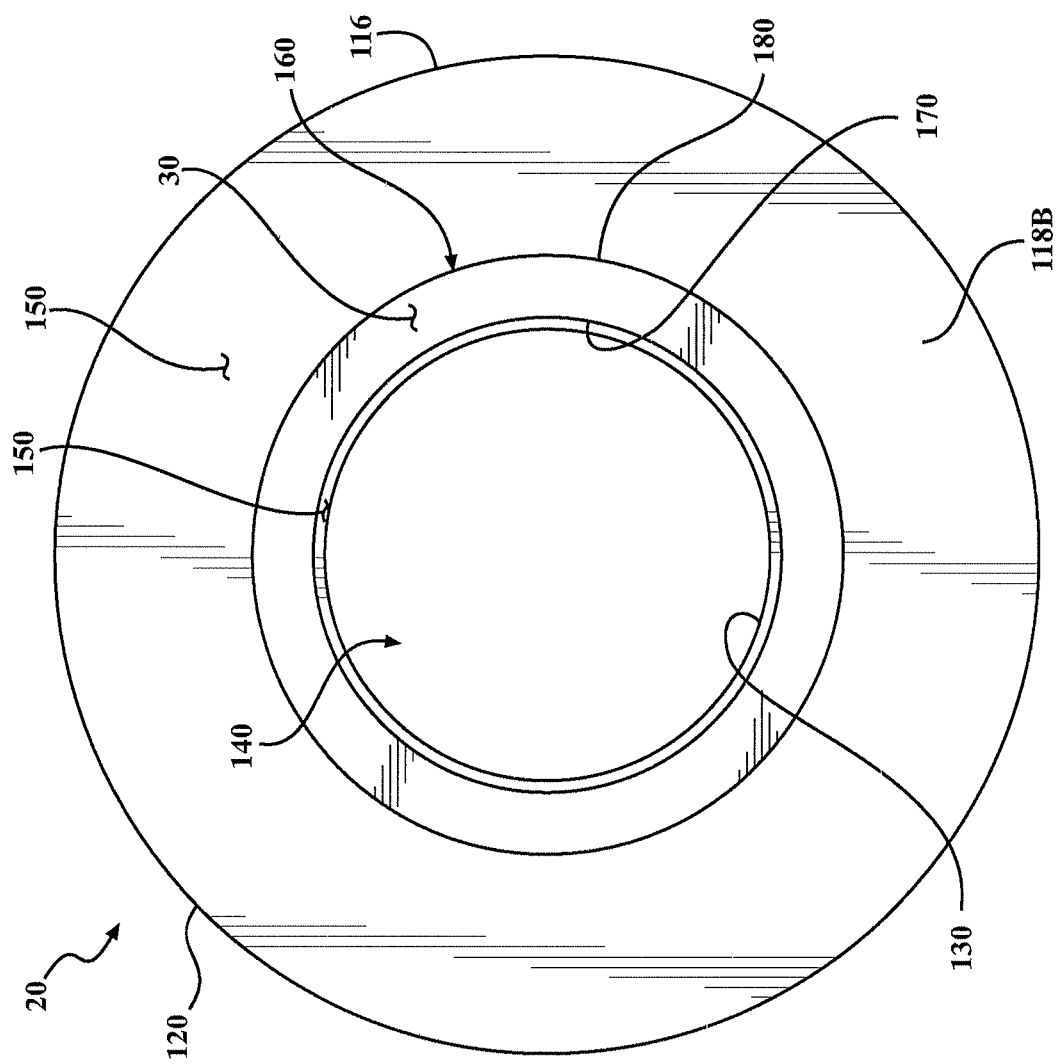
FIG. 4 is a top plan view of the plastic deflector of FIG. 3.
Figure 3:
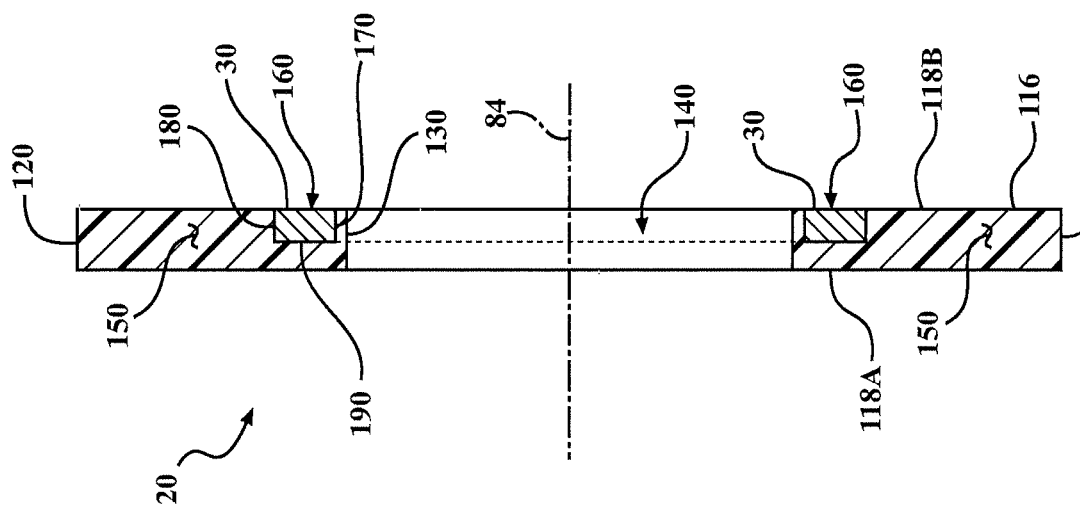
FIG. 3 is a cross-sectional view of a first embodiment of the plastic deflector of FIG. 1, illustrating the stainless steel running surface.

A cross-sectional view and a side view are shown in FIGS. 3 and 4, respectively, of one embodiment of the plastic deflector 20. Referring to FIGS. 2 through 4, the plastic deflector 20 has a generally disc-shaped main body 116 extending between an upper surface 118A and a lower surface 118B and bounded by an outer cylindrically-shaped surface 120. Further, the plastic deflector 20 has an inner cylindrical wall 130 extending in an axial direction 84 between the upper and lower surfaces 118A, 118B defining a passageway 140 through the plastic deflector 20. The disc-shaped main body 116 comprises a plastic portion 150 formed of a plastic material. Preferably, the plastic portion 150 is formed from a glass-filled plastic material. However, selection of a specific plastic material, including a desired percentage of glass fill, is based in part on the operating conditions of the intended application as well as based on other factors such as requirements by original equipment manufacturers (OEM), cost, durability, and the like.

Referring to FIGS. 3 and 4, the plastic deflector 20 includes a stainless steel washer or ring 160 fixedly coupled to the disc-shaped main body 116. The stainless steel ring 160 can be mechanically locked into position, mechanically fastened to the plastic portion 150, molded-in, or embedded into the plastic portion 150 during a molding process. The stainless steel ring 160 has a first cylindrical surface 170 defining an inner diameter 170 of the ring 160, a second cylindrical surface 180 defining an outer diameter 180 of the ring 160, and opposing upper and lower surfaces 190, 30. The lower surface 30 of the ring 160 provides the stainless steel running surface 30 against the axial lip 70 of the pinion seal 60. The plastic portion 150 surrounding the ring 160 provides a cost and weight savings, as well as an ease of manufacturability of the plastic deflector 20 while increasing the contamination exclusion capabilities of the pinion seal 60. A majority of the novel deflector 20 is made of plastic except where the axial lip 70 contacts the ring 160 of the novel deflector 20. The ring 160 is preferably made of a stainless steel so the axial lip 70 does not wear through the plastic deflector 20.

Returning to FIG. 2, the plastic deflector 20 is optionally assembled with the flange 100 as illustrated by arrow A2. The inner cylindrical wall 130 and the passageway 140 of the plastic deflector 20 are configured such that the plastic deflector 20 can be pressed onto one end 194 of the flange 100 for form a flange/deflector assembly 196. As show in FIG. 2, the flange 100 includes a recessed ledge 200 extending circumferentially around the flange 100 configured to frictionally engage with the inner cylindrical wall 130 of the plastic deflector 20. As illustrated by arrow A3 shown in FIG. 5, after the plastic deflector 20 is assembled with the flange 100, the flange/deflector assembly 196 is assembled with the pinion shaft 40 to form the differential 10 shown in FIG. 1. The plastic deflector 20 compresses the axial lip 70 of the pinion seal 60 to form a seal between the stainless steel running surface 30 and the axial lip 70. Preferably, the axial lip 70 is compressed between about 0.8 mm and about 1.2 mm during the assembly process shown in FIG. 5. However, in alternate embodiments, the plastic deflector 20 can compress the axial lip 70 more or less than between about 0.8 mm and about 1.2 mm, including the plastic deflector 20 optionally being spaced apart from the upper surface 72 of the axial lip 70.

Figure 6:
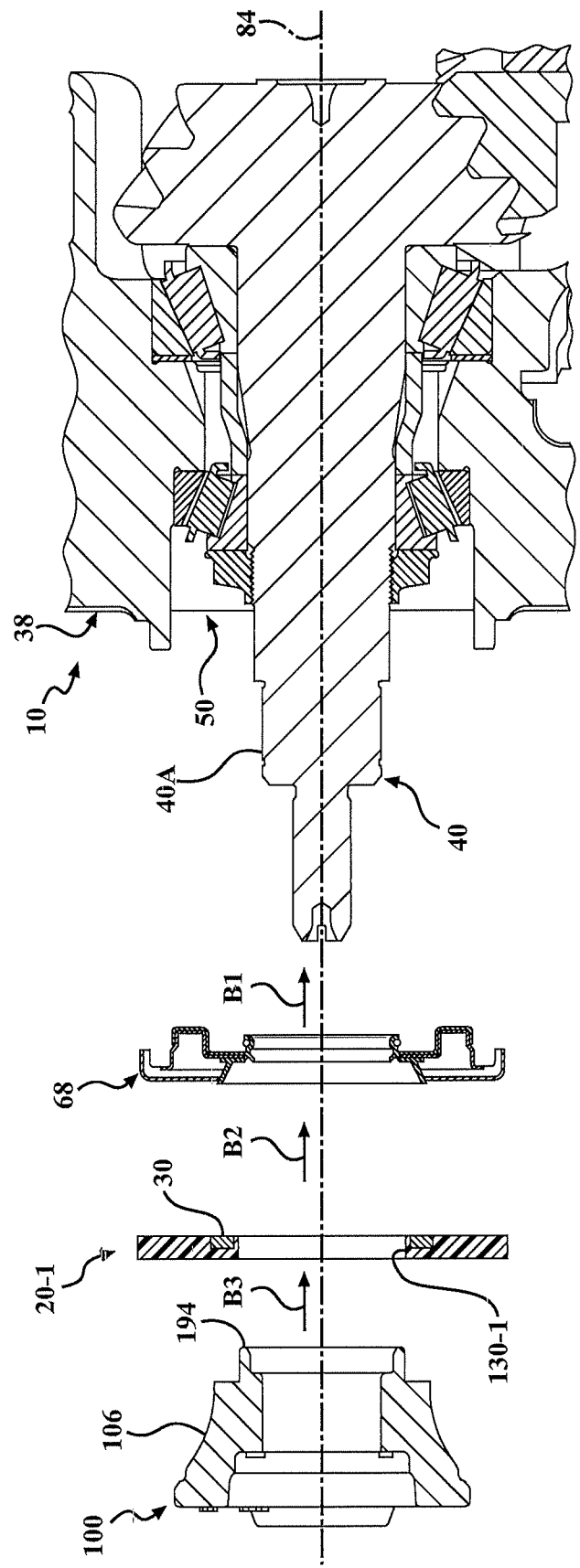
FIG. 6 illustrates another embodiment of the portion of the differential of FIG. 1, illustrating the pinion seal, the plastic deflector, and flange being assembled with the pinion shaft.
Figure 7:
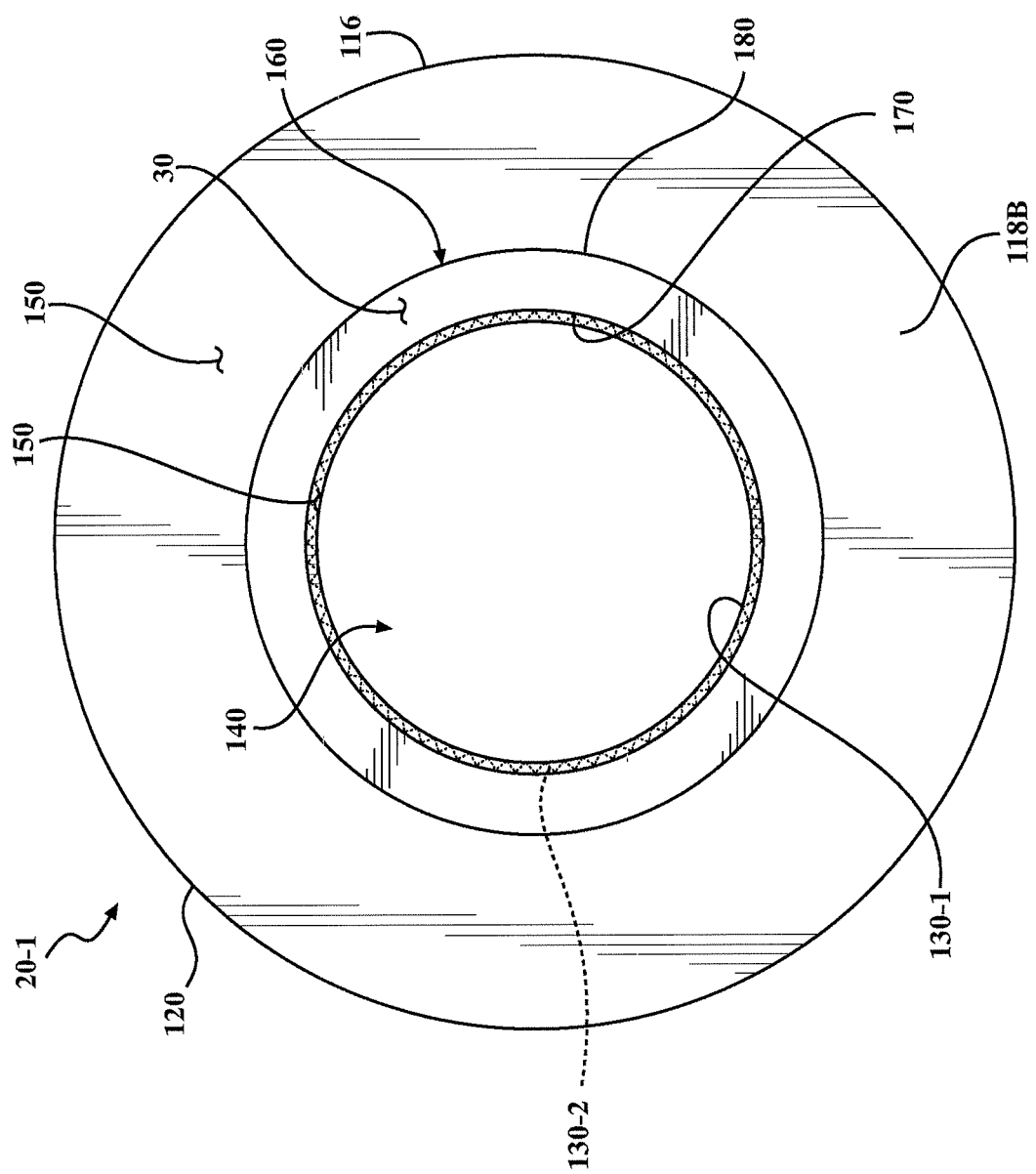
FIG. 7 is a top plan view of a second embodiment of the plastic deflector of FIG. 4.

A second embodiment of the plastic deflector 20-1 is shown in FIGS. 6 and 7. FIG. 6 illustrates an alternate assembly method for assembling the plastic deflector 20-1 with the pinion shaft 40. The pinion seal 68 is assembled with the pinion shaft 40 as illustrated by arrow B1. The plastic deflector 20-1 is configured to be directly assembled with the pinion shaft 40, as illustrated by arrow B2, after the pinion seal 60 is assembled with the pinion shaft 40. The second embodiment of the plastic deflector 20-1, shown in FIGS. 6 and 7, is configured to be pressed onto the pinion shaft 40. Alternatively, the plastic deflector 20-1 can be assembled with the pinion shaft 40 such that the inner cylindrical wall 130-1 of the plastic deflector 20-1 does not frictionally engage with the pinion shaft 40. In addition, the inner cylindrical wall 130-1 can be replaced with a non-cylindrical surface if desired for assembling with the pinion shaft 40. For example, FIG. 7 illustrates the inner wall 130-1 of the plastic deflector 20-1 having a splined shape 130-2 configured to matingly engage with a splined shaft surface 40A on the pinion shaft 40. Also shown in FIG. 6, the flange 100 is assembled with the pinion shaft 40 as illustrated by arrow B3 after the pinion seal 68 and the plastic deflector 20-1 are assembled with the pinion shaft 40.

Figure 8:
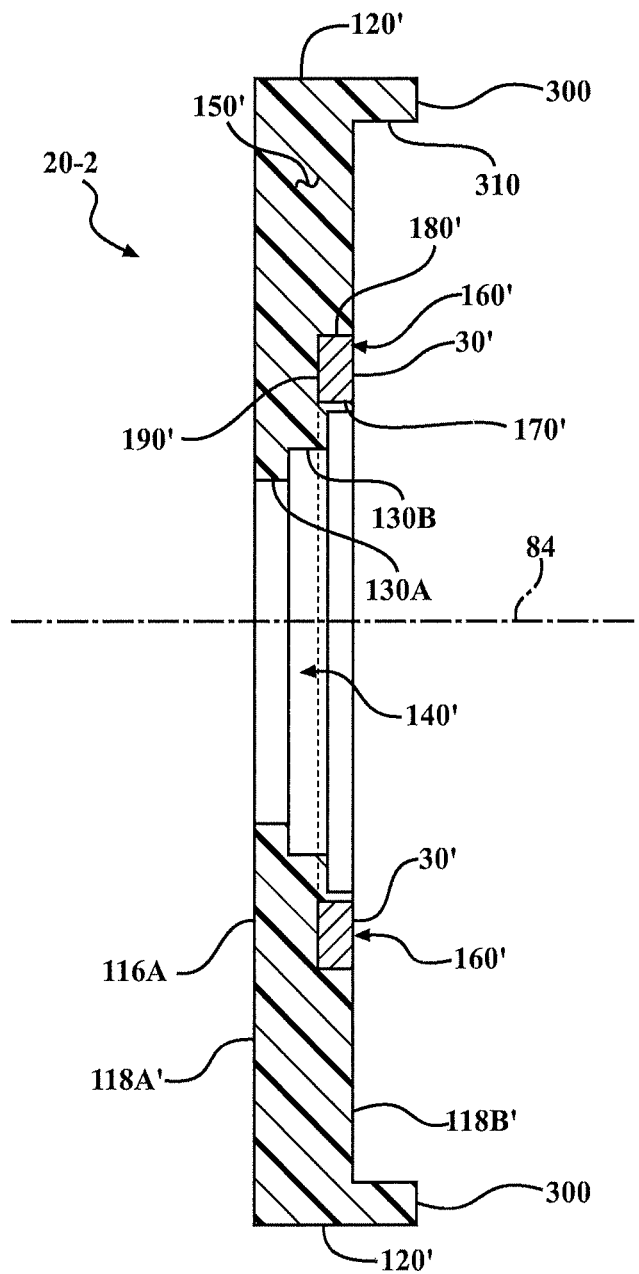
FIG. 8 is a cross-sectional view of a third embodiment of the plastic deflector of FIG. 1, illustrating the plastic deflector having a lip that projects at an angle from the plastic deflector and further illustrating the plastic deflector being configured to be pressed onto the pinion shaft.

A third embodiment of the plastic deflector 20-2 is illustrated in FIG. 8. As with the plastic deflectors 20, 20-1 shown in FIGS. 1-7, the third embodiment includes a generally disc-shaped main body 116A extending between opposing upper and lower surfaces 118A', 118B' and bounded by an outer cylindrically-shaped surface 120'. Further, the plastic deflector 20-2 has an inner cylindrical wall 130A, 130B extending in an axial direction 84 defining a passageway 140' through the plastic deflector 20-2. The plastic deflector 20-2 comprises a plastic portion 150' and a stainless steel ring 160' fixedly coupled to the plastic portion 150'. The ring 160' has opposing upper and lower surfaces 190', 30' extending between inner and outer cylindrical walls 170', 180'. The lower surface 30' of the ring 160' provides the stainless steel running surface 30' configured to frictionally engage with the axial lip 70 of the pinion seal 60. The inner cylindrical walls 130A, 130B are configured to matingly engage and/or frictionally engage with the pinion shaft 40.

As with the second embodiment, the inner cylindrical walls 130A, 130B can be non-cylindrical. For example, the inner cylindrical walls 130A, 130B can be a single cylindrical wall 130A, 130B, offset walls 130A, 130B, a splined shaped profile such as illustrated in the embodiment shown in FIG. 7, or another shape configured to engage with a specific pinion shaft 40.

As an alternative, the embodiment shown in FIG. 8 illustrates a plastic deflector 20-2 having a rim 300 projecting away from the lower surface 118B' of the disc-shaped main body 116A in the axial direction 84. The rim 300 extends circumferentially around the disc-shaped main body 116A. The outer surface 120' of the disc-shaped main body 116 forms an outer surface 120' of the rim 300. The rim 300 has an inner surface 310 configured to be spaced apart from an outer edge 68 of the pinion seal 60. Further, the inner surface 310 of the rim 300 is configured to be spaced apart from the rim 54 surrounding the opening 50 in the differential case 38. The rim 300 extends in the axial direction 84 away from the disc-shaped main body 116A of the plastic deflector 20-2. Further, the rim 300 is configured to span an axial gap between the disc-shaped main body 116A and the differential case 38 when the plastic deflector 20-2 is assembled with the pinion shaft 40 and the differential case 38.

Figure 9:
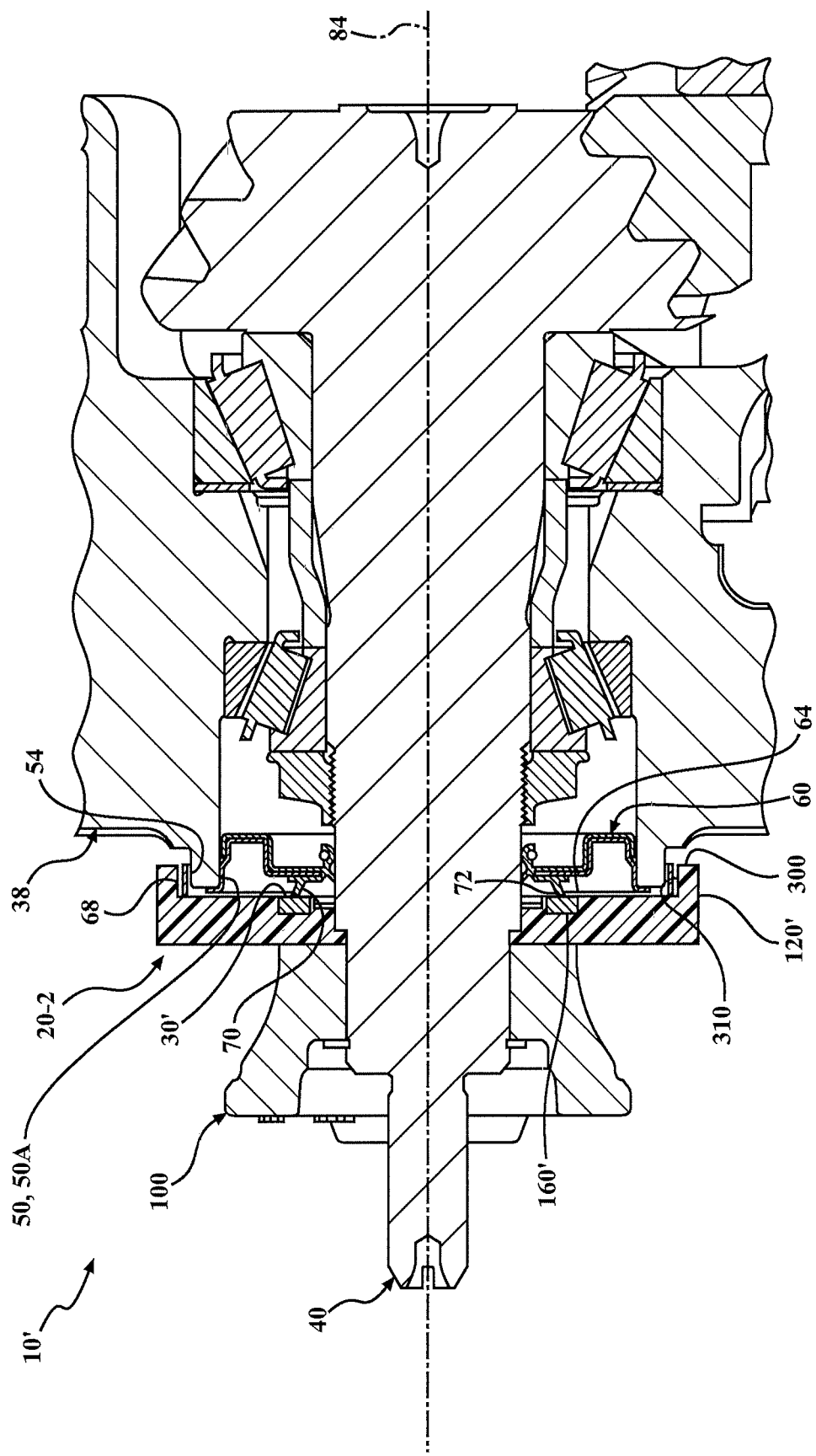
FIG. 9 is a cross-sectional view of the portion of the rear wheel drive differential of FIG. 1 with the third embodiment of the plastic deflector assembled with the pinion shaft.

The plastic deflector 20-2 of FIG. 8 is shown assembled with the differential 10' in FIG. 9. As with the prior embodiments of the plastic deflector 20, 20-1, the third embodiment of the plastic deflector 20-2 is assembled with the pinion shaft 40 such that the stainless steel running surface 30' frictionally engages with the upper surface 72 of the axial lip 70 of the pinion seal 60. Preferably, the stainless steel running surface 30' of the plastic deflector 20-2 compresses the upper surface 72 of the axial lip 70 between about 0.8 mm and about 1.2 mm to ensure a suitable seal between the axial lip 70 and the plastic deflector 20-2.

Also shown in FIG. 9, the rim 300 of the plastic deflector 20-2 extends around the rim 54 of the differential case 38. In specific, the inner surface 310 of the rim 300 is spaced apart from the rim 54 of the opening 50 to the differential case 38. Further, the inner surface 310 of the rim 300 is spaced apart from the outer periphery 68 of the pinion seal 60. Various embodiments of the plastic deflector 20, 20-1, 20-2 can include the optional rim 300 and can include other profiled surfaces to provide desired coverage around the pinion seal 60. The selection of the overall dimensions, material composition, and shape of the plastic deflector 20, 20-1, 20-2 is chosen in part due to the operating conditions of the intended differential 10, 10'. Likewise, various embodiments of the plastic deflector 20, 20-1, 20-2 are configured to be assembled with the pinion shaft 40 as required for specific applications.

Figure 10:
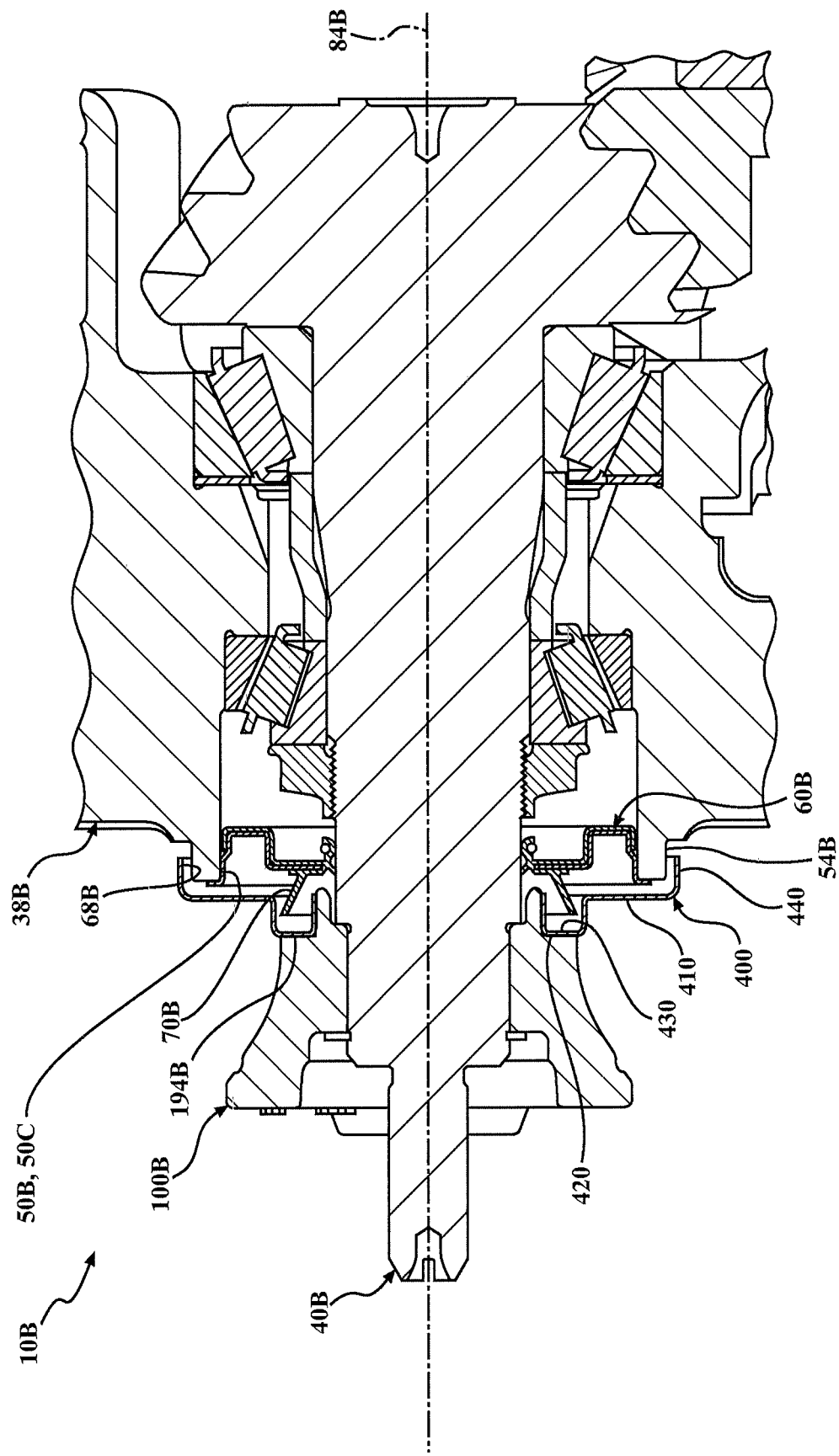
FIG. 10 is a cross-sectional view a portion of a known rear wheel drive differential illustrating a known stainless steel deflector.

Each embodiment of the plastic deflector 20, 20-1, 20-2 includes the stainless steel running surface 30, 30' integrated within the plastic portion 150, 150'. The plastic deflector 20, 20-1, 20-2 comprises mostly a plastic material, and as such has a lower cost than a typically known stainless steel deflector 400 shown in FIG. 10. FIG. 10 illustrates a cross-sectional view of a portion of a known differential 10B for a rear wheel drive vehicle. The known differential 10B includes a differential case 38B for rotational supporting and housing a pinion shaft 40B. The pinion shaft 40B extends axially through an opening 50B in the differential case 38B to connect with and drive the rear wheels of the vehicle. The known differential case 38B includes a rim 54B extending around an outer periphery 50C of the opening 50B. A pinion seal 60B extends around the pinion shaft 40B and abuts a cavity wall 50C defining the opening 50B in the differential case 38B. The pinion seal 60B includes an axial lip 70B extending in an axial direction 84B from an upper surface 72B of the pinion seal 60B.

The known stainless steel deflector 400 shown in FIG. 10 includes a disc-shaped main body 410 having a recessed channel 420 extending circumferentially around the known stainless steel deflector 400. The channel 420 is configured such that a lower surface 430 of the channel 420 is spaced apart from the axial lip 70B of the pinion seal 60B when the known deflector 400 is assembled with the pinion shaft 40B and the pinion seal 60B. A flange 100B is assembled with the pinion shaft 40B such that a lower surface 194B of the flange 100B abuts the stainless steel deflector 400.

The channel 420 forms a non-contact labyrinth-type seal with the axial lip 70B of the pinion seal 60B. Non-contact labyrinth-type seals typically are configured to have a controlled clearance with the axial lip 70B of the pinion seal 60B to minimize leakage of oil and minimize intrusion of contamination. Some known stainless steel deflectors 400 are configured such that the inner surface 430 of the main body 410 compresses the axial lip 70B to form a physical seal between the known stainless steel deflector 400 and the pinion seal 60B.

In addition, the known stainless steel deflector 400 shown in FIG. 10 includes a rim 440 extending in the axial direction 84B away from the main body 410 of the known deflector 400. The rim 440 is configured such that the rim 440 is spaced apart from the outer edge 68B of the pinion seal 60B and spaced apart from the rim 54B extending around the opening 50B to the differential case 38B when the known deflector 400 is assembled with the pinion shaft 40B.

However, the known stainless steel deflectors 400 have a higher material cost than the novel plastic deflectors 20, 20-1, 20-2 shown in FIGS. 1-9 since the known stainless steel deflectors 400 comprise solely stainless steel. The novel plastic deflectors 20, 20-1, 20-2 have a reduced material cost over the known stainless steel deflectors 400 since the novel plastic deflectors 20, 20-1, 20-2 comprise mostly a plastic material.

Further, the known stainless steel deflectors 400 can cause galvanic corrosion within the differential 10B. The novel plastic deflectors 20, 20-1, 20-2 reduce the probability of developing galvanic corrosion within the differential 10, 10' since the plastic deflectors 20, 20-1, 20-2 include less stainless steel material than is included within the known stainless steel deflectors 400. The plastic deflectors 20, 20-1, 20-2 include a stainless steel ring 160, 160' fixedly coupled to the plastic portion 150, 150' of the novel deflector 20, 20-1, 20-2 to provide a wear surface 30, 30'. The amount of stainless steel material within the stainless steel ring 160, 160' is significantly less than the amount of stainless steel material in the known stainless steel deflector 400. This reduction in the amount of stainless steel material in the novel plastic deflector 20, 20-1, 20-2 reduces the cost and weight over the known stainless steel deflector 400 as well as reducing the amount of galvanic corrosion induced in the differential 10, 10'.

Finally, it should be appreciated that the novel plastic deflector 20, 20-1, 20-2 may be utilized to seal between any axial shaft and housing such as any drive shaft and casing in a driveline or transmission of an automotive vehicle.

One benefit of the plastic deflector 20, 20-1, 20-2 having the stainless steel running surface 30, 30' is the plastic deflector 20, 20-1, 20-2 has a lower cost than typical known stainless steel deflectors 400 since the plastic deflector 20, 20-1, 20-2 comprises mostly a plastic material. A second benefit is the plastic deflector 20, 20-1, 20-2 forms an improved seal between the pinion shaft 40 and the differential case 38 since the stainless steel running surface 30, 30' is configured to abut and compress the axial lip 70 of the pinion seal 60. A third benefit is a reduction in galvanic corrosion within the differential 10 since the plastic deflector 20, 20-1, 20-2 only has stainless steel forming the stainless steel running surface 30, 30' with the remainder of the plastic deflector 20, 20-1, 20-2 being formed of a plastic material.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A differential for a rear wheel drive vehicle, said differential comprising:
    a differential case for rotationally supporting and housing a pinion shaft;
    said pinion shaft extending axially through an opening in said differential case, said pinion shaft defining an axial direction;
    a pinion seal extending around said pinion shaft, said pinion seal having an outer edge abutting a cavity wall defining said opening in said differential case, and said pinion seal having an axial lip projecting in said axial direction from said pinion seal; and
    a plastic deflector having a disc-shaped main body having a plastic portion formed of a plastic material, a stainless steel ring fixedly coupled to said disc-shaped main body providing a stainless steel running surface on said plastic deflector, and a deflector passageway extending through said plastic deflector in said axial direction, said plastic deflector being assembled on said pinion shaft such that said pinion shaft extends through said deflector passageway and said stainless steel running surface abuts said axial lip of said pinion seal.

2. The differential as set forth in claim 1, wherein:
    said plastic deflector forms a seal between said pinion shaft and said differential case.

3. The differential as set forth in claim 2, wherein said plastic material comprises a glass-filled plastic material.

4. The differential as set forth in claim 3, further including:
    a flange having a flange passageway extending through said flange configured to be matingly engaged with said pinion shaft; and
    said flange being assembled to said pinion shaft such that said pinion shaft extends through said flange passageway and said flange abuts said plastic deflector.

5. The differential as set forth in claim 4, wherein:
    said flange includes a recessed ledge extending around an outer periphery of said flange;
    said deflector passageway of said plastic deflector being configured to matingly engage with said recessed ledge extending around said outer periphery of said flange;
    said plastic deflector being assembled with said flange by matingly engaging said deflector passageway with said recessed ledge to form a flange/deflector assembly;
    said flange/deflector assembly being assembled with said pinion shaft by passing a portion of said pinion shaft through said flange passageway of said flange until said stainless steel running surface of said plastic deflector abuts said axial lip of said pinion seal.

6. The differential as set forth in claim 5, wherein:
    said deflector passageway being configured to matingly engage with an outer periphery of said pinion shaft.

7. The differential as set forth in claim 5, wherein said stainless steel ring is molded-in and/or embedded into said plastic portion of said disc-shaped main body.

8. The differential as set forth in claim 5, wherein said stainless steel ring is mechanically fastened to said disc-shaped main body.

9. The differential as set forth in claim 5, wherein:
    a rim extends in said axial direction away from said disc-shaped main body of said plastic deflector, said rim configured to span an axial gap between said disc-shaped main body and said differential case when said plastic deflector is assembled with said pinion shaft and said differential case.

\* \* \* \* \*